(12) United States Patent
Kratish et al.

(10) Patent No.: US 6,471,175 B1
(45) Date of Patent: Oct. 29, 2002

(54) TOOL FOR HANGING A FRAME

(76) Inventors: Martin L. Kratish, 5200 SW. 115th Ave., Cooper City, FL (US) 33330; Lawrence Kratish, 8741 Lake Dasha Ter., Plantation, FL (US) 33324

(*) Notice: Subject to any disclaimer, the term of this patent is extended or adjusted under 35 U.S.C. 154(b) by 0 days.

(21) Appl. No.: 09/192,748

(22) Filed: Nov. 16, 1998

Related U.S. Application Data

(63) Continuation-in-part of application No. 08/970,598, filed on Nov. 14, 1997, which is a continuation-in-part of application No. 08/795,251, filed on Feb. 10, 1997, now abandoned.

(51) Int. Cl.[7] ............... A47F 1/14; A47F 7/14; A47G 1/16; A47G 1/06; B60R 1/02
(52) U.S. Cl. ............ 248/466; 248/475.1; 248/916; 40/713
(58) Field of Search ............... 248/466, 460, 248/470, 475.1, 465, 477, 495, 496, 916; 40/713, 757; 33/613, 42

(56) References Cited

U.S. PATENT DOCUMENTS

| | | | |
|---|---|---|---|
| 1,005,499 A | * | 10/1911 | Baker |
| 1,908,147 A | * | 5/1933 | Hoegger |
| 2,641,527 A | * | 6/1953 | Krogh |
| 2,952,431 A | * | 9/1960 | Pedley ............... 248/495 |
| 4,212,123 A | * | 7/1980 | Robin |
| 4,241,510 A | * | 12/1980 | Radecki ............... 33/613 |
| 4,295,625 A | * | 10/1981 | Degger et al. ............ 248/466 |
| 4,597,554 A | * | 7/1986 | James |
| 4,936,033 A | * | 6/1990 | Lacko ............... 40/765 |
| 5,080,317 A | * | 1/1992 | Letizia ............... 248/466 |
| 5,103,573 A | * | 4/1992 | Ehling et al. ............ 33/613 |
| 5,303,895 A | * | 4/1994 | Hart ............... 248/475.1 |
| 5,314,159 A | * | 5/1994 | Szarata ............... 248/476 |
| 5,433,416 A | * | 7/1995 | Johnson ............... 248/475.1 |
| 5,758,858 A | * | 6/1998 | Barnes ............... 248/475.1 |
| 5,801,891 A | * | 9/1998 | Lloyd ............... 248/475.1 |
| 5,878,987 A | * | 3/1999 | Hayde ............... 248/477 |
| 5,906,349 A | * | 5/1999 | Roy ............... 248/496 |
| 5,915,806 A | * | 6/1999 | Levee ............... 33/42 |
| 5,927,675 A | * | 7/1999 | Kratish et al. ............ 248/466 |

* cited by examiner

*Primary Examiner*—Kimberly T. Wood
(74) *Attorney, Agent, or Firm*—Laurence A. Greenberg; Werner H. Stemer; Gregory L. Mayback

(57) ABSTRACT

A frame hanging tool has an elongated body member formed with a plurality of openings. Inserts are removably fastened to the body member in the openings. The inserts are each configured to receive and guide fasteners such as nails and screws. One of the inserts has a level for indicating whether the fasteners received in the inserts are aligned level with respect to each other. In this manner, a person is assured that the object being hung will be level.

21 Claims, 9 Drawing Sheets

TOOL FOR HANGING A FRAME

CROSS-REFERENCE TO RELATED APPLICATION

This application is a continuation-in-part of application Ser. No. 08/970,598, filed Nov. 14, 1997, which is a continuation-in-part of Ser. No. 08/795,251, filed Feb. 10, 1997, now abandoned.

BACKGROUND OF THE INVENTION

1. Field of the Invention

The invention relates, generally, to a tool which assists in hanging an object on a structure, and more specifically, it relates to determining the placement of fasteners such as nails for the purpose of hanging pictures, frames, carpets, sculptures, etc. on the same horizontal, evenly spaced plane.

2. Description of the Related Art

Various devices are known which assist in hanging pictures and like objects so that the object will hang level. However, there remains a need for an improved method for hanging framed works and similar items that will hang securely in a level position.

U.S. Pat. No. 2,952,431 to Pedley teaches a cross bar which attaches to the back of a frame of an item to be hung on a wall. At the bottom of the frame there is secured an end piece into which the cross bar is held. The cross bar can be maneuvered within the confines of the end piece in such a manner that the frame can be leveled out should the frame be initially off center. As can be seen, the Pedley taught invention requires time, effort and expense to secure the cross piece and the end piece to the frame.

U.S. Pat. No. 5,303,895 to Hart teaches an apparatus which is attached to a frame before the frame is mounted to a surface such as a wall. The Hart taught apparatus has a built in level for assisting in the proper placement of the apparatus on the frame. The apparatus contain areas in which fasteners may be inserted to attach the frame and apparatus to the wall. As can be seen, the Hart taught invention requires time, effort and expense to secure the apparatus to the frame.

SUMMARY OF THE INVENTION

It is accordingly an object of the invention to provide a tool for hanging a frame which overcomes the herein-mentioned disadvantages of the heretofore-known devices and methods of this general type, and which provides a tool that assists in hanging a frame perfectly level on a surface that is easy to use and inexpensive to manufacture.

The invention is a tool that sets the proper placement of fasteners such as nails, screws, pegs, mollies, hooks, bull hooks, etc. for the purpose of hanging objects such as pictures, frames, sculptures, and other items on the fasteners or devices attached to the fasteners. The invention may also be advantageously used to hang multiple objects, evenly spaced, and on the same plane.

With the foregoing and other objects in view there is provided, in accordance with the invention, a frame hanging tool, including: an elongated body member having a plurality of openings formed therein; and at least one insert inserted in one of the plurality of openings and self securing to the elongated body member, the at least one insert receiving and guiding a fastener to be secured to a structure.

In accordance with an added feature of the invention, the at least one insert is one of a plurality of inserts including a leveling insert having a level for determining whether a plurality of fasteners are aligned level with respect to each other and a fastener guiding insert for receiving and aligning one of the plurality of fasteners.

In accordance with an additional feature of the invention, there is a ruler disposed on the elongated body member.

In accordance with another feature of the invention, the elongated body member is formed of a material selected from the group consisting of wood, plastic, metal and composite material.

In accordance with a further added feature of the invention, the elongated body member has a length of approximately 12, 18, 24 or 36 inches.

In accordance with a further additional feature of the invention, the elongated body member has recessed borders formed therein for self engaging with the at least one insert. The recessed borders surround the plurality of openings formed in the body member.

In accordance with yet another feature of the invention, the at least one insert has overhanging edges for securing to the recessed borders of the elongated body member.

In accordance with yet another added feature of the invention, the elongated body member has ends each formed with an end opening therein.

In accordance with yet another additional feature of the invention, there is an end connector received in the end opening of each of two adjacent elongated body members for joining the adjacent elongated body members.

In accordance with an added feature of the invention, the at least one insert is formed with a fastener guide path and a semicircular hole therein for receiving and guiding the fastener.

In accordance with an additional feature of the invention, the at least one insert is formed with a U-shaped fastener opening therein for receiving and guiding the fastener.

In accordance with another feature of the invention, the at least one insert is substantially L-shaped.

In accordance with a concomitant feature of the invention, the at least one insert has a side formed with a step for receiving and guiding the fastener.

Other characteristic features of the invention are set forth in the appended claims.

Although the invention is illustrated and described herein as embodied in a tool for hanging a frame, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

Figure 1:
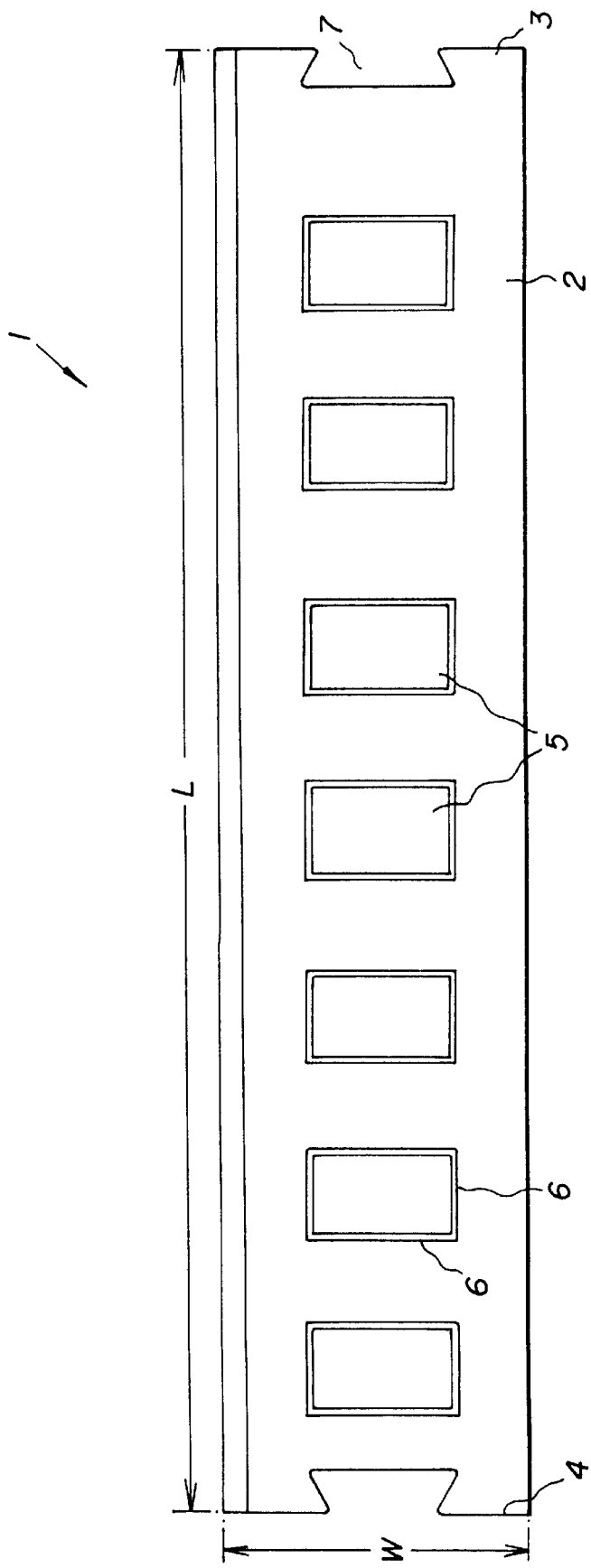
FIG. 1 is a diagrammatic, front elevational view of a frame hanging tool in accordance with the invention.

DESCRIPTION OF THE PREFERRED EMBODIMENTS:

Referring now to the figures of the drawings in detail and first, particularly, to FIG. 1 thereof, there is shown a frame hanging tool 1. The frame hanging tool 1 has an elongated body member 2 having a rectangular shape. The body member 2 has a first end 3, a second end 4, a length L, a width W and a thickness. The length L of the body member 2 is arbitrary (i.e. 6 inches to 10 feet) but preferably comes in 1 foot, 18 inches, 2 foot, 3 foot and 1 meter lengths. The width W of the body member 2 is arbitrary but is preferably in the range of 1–8 inches. The thickness of the body member 2 is arbitrary but is preferably in the range of ⅛–1 inch.

The body member 2 is ideally made out of a light weight, pliable material which can traverse irregular surfaces. The body member 2 can be made out of various materials including plastic, metal, wood and composite materials. Although, the frame hanging tool 1 is preferably in a rectangular shape, other shapes such as squares, triangles, circles, irregular rectangles, etc. are possible.

Figure 2:
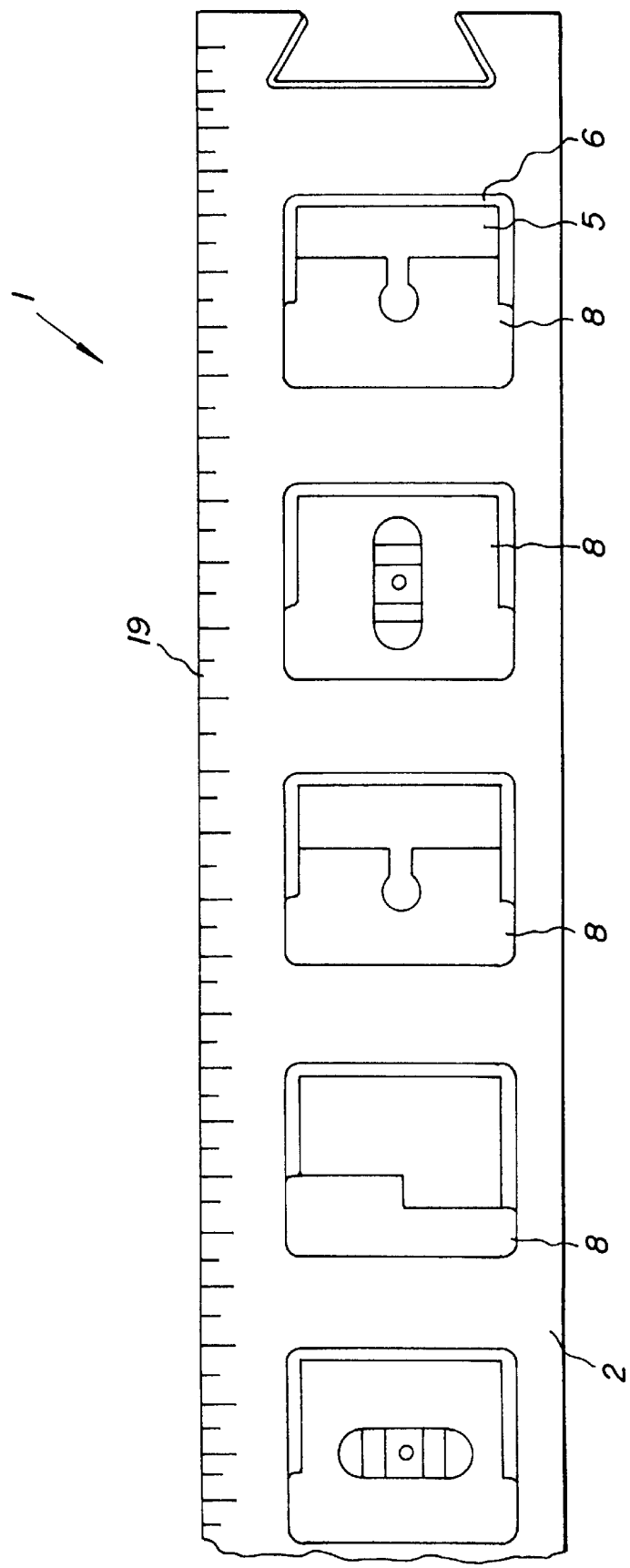
FIG. 2 is an enlarged, fragmentary, front elevational view of a first end portion of the frame hanging tool.

The body member 2 is formed with a plurality of openings 5 which are defined by recessed borders (steps) 6. The openings 5 can be formed of any shape, but are illustrated for example as rectangular shapes being 1¼×1½ inches. The body member 2 is also formed with a pair of end openings 7. FIG. 2 shows a plurality of removable inserts 8 disposed in the openings 5 and held by the recessed borders 6 of the body member 2. The inserts 8 can be individually removed and placed in any of the openings 5. The inserts 8 are configured to be inserted into the openings 5 from either the left side or the right side.

Figure 3:
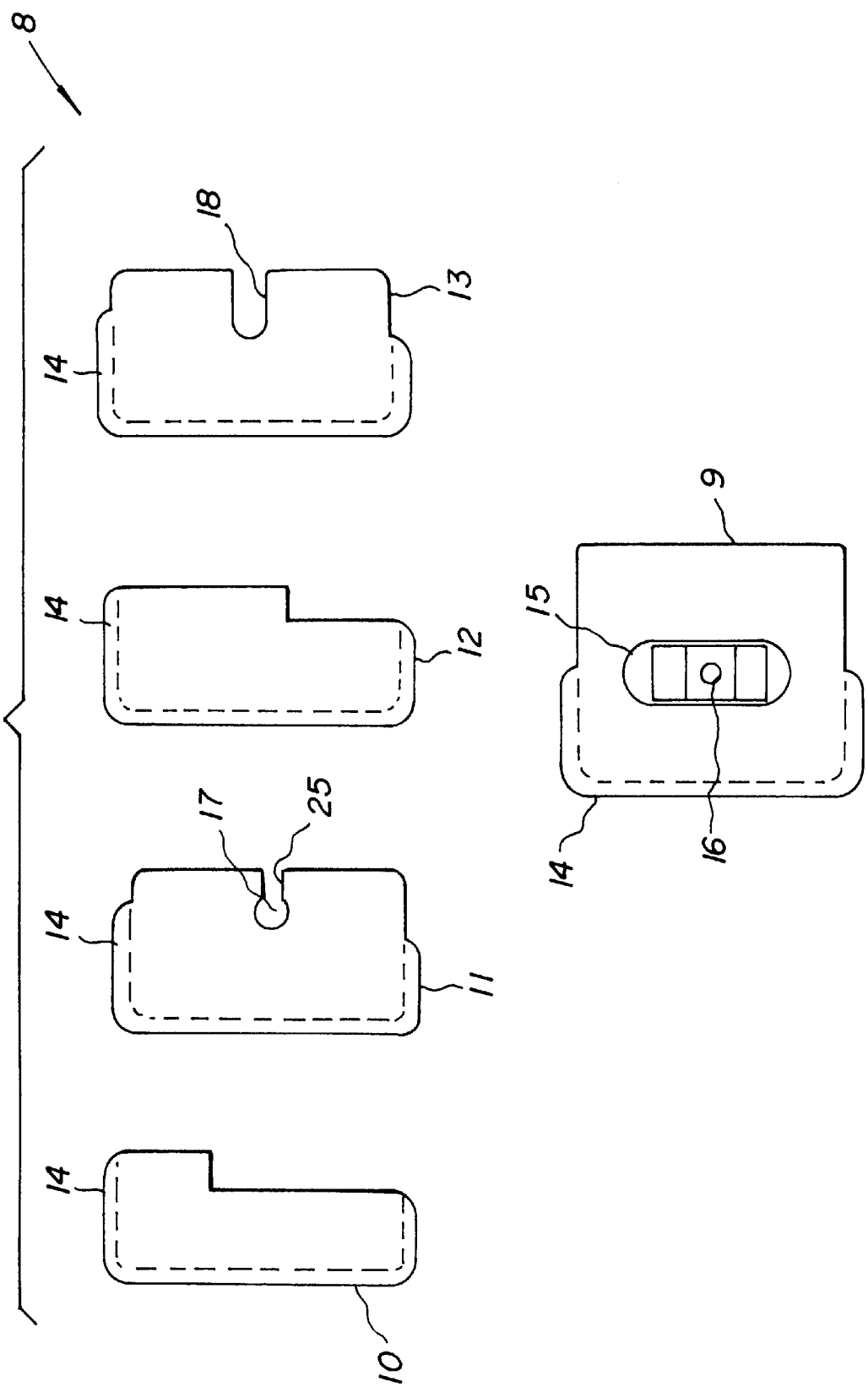
FIG. 3 is a front elevational view of inserts to be attached to the frame hanging tool.

FIG. 3 shows a plurality of the inserts 8 including a level insert 9, a L-shaped insert 10, a screw or nail insert 11, a stepped insert 12 and a general fastener insert 13. All of the inserts 9–13 have overhanging edges 14 for engaging with the recessed borders 6 of the body member 2.

The level insert 9 has a recess 15 for receiving and securing a level 16. The recess 15 can be oriented to receive the level 16 in either a horizontal or vertical direction.

The L-shaped insert 10 is configured to guide and receive a fastener such as a bull hook. The stepped insert 12 is formed with an arbitrarily positioned step 26 that is also used to receive and guide fasteners such as bull hooks.

The screw and nail insert 11 is configured with a fastener guide path 25 and an opening 17 for receiving and centering a nail, screw and similar type fasteners. The general fastener insert 13 is also provided with a U-shaped opening 18 which receives and centers other types of fasteners including pegs, hooks and mollies. It is noted that the openings 17 and 18 can be of various sizes and shapes to fit various types of fasteners and are not limited to those shown in the drawings. In this manner, the frame hanging tool 1 can be adapted to handle any kind of fasteners including but not limited to nails, screws, mollies, hooks, bull hooks, pegs, etc.

Figure 4:
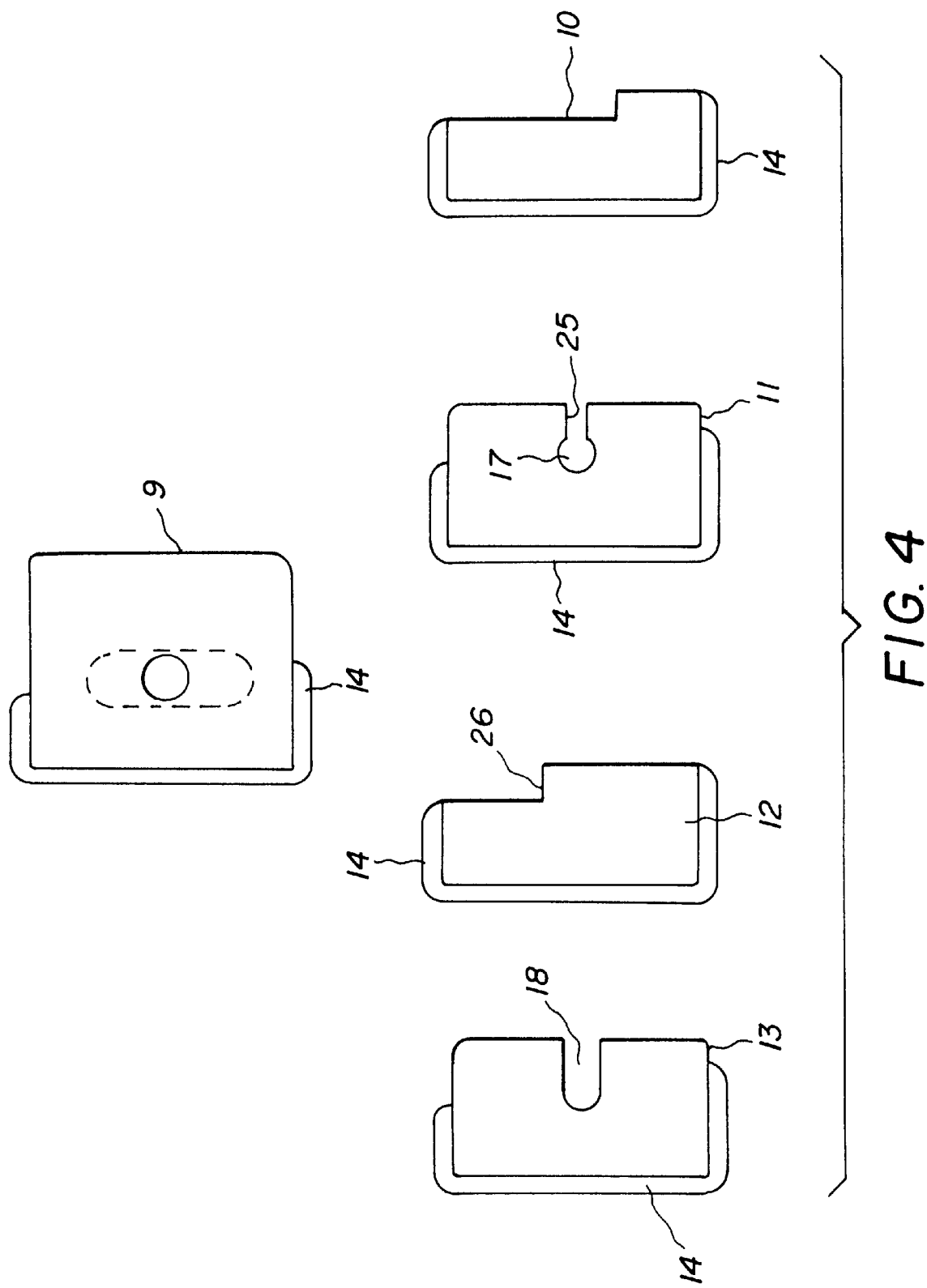
FIG. 4 is a rear elevational view of the inserts to be attached to the frame hanging tool.

FIG. 4 shows a rear view of the inserts 8 all having the overhanging edges 14 for engaging the recessed borders 6 of the body member 2. The overhanging edges 14 and the recessed borders 6 are dimensioned such that the overhanging edges 14 of the inserts 8 self secure to the recessed borders 6.

Similarly, the inserts 8 are removed by applying a force to the inserts 8 in a direction away from the recessed borders 6 to overcome the frictional forces of the slightly oversized overhang edges 14. It is noted that other fastening techniques such as pin and socket devices could be employed for securing the inserts 8 to the body member 2.

Figure 5:
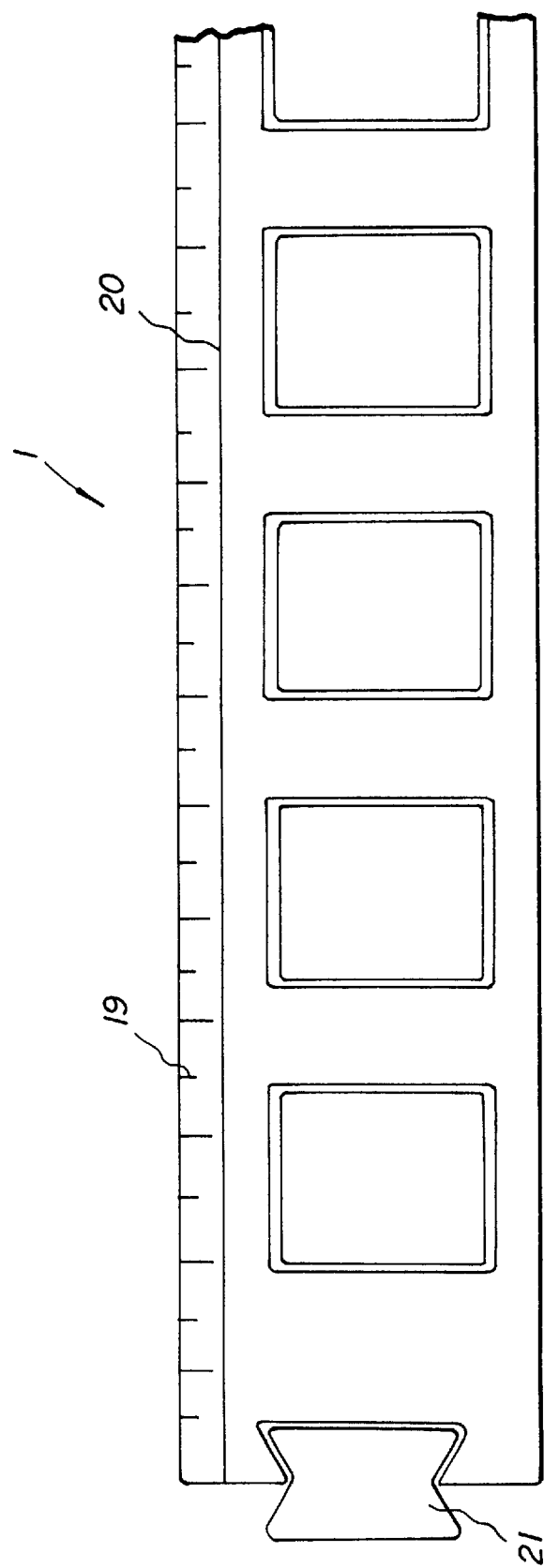
FIG. 5 is an enlarged, fragmentary, front elevational view of a second end portion of the frame hanging tool.

FIG. 5 shows the frame hanging tool 1 having measuring units 19 embedded into the body member 2. The measuring units assist in measuring the length between two inserts 8 or two fasteners to be inserted into a structure. As shown in FIG. 5, the measuring units 19 start at one end of the body member 2 and form a ruler which runs the length L of the body member 2. In addition to being formed directly in the body member 2 as shown in FIG. 2, the measuring unit 19 can be formed on a structural support clip 20 (FIG. 5). The structural support clip 20 can run up to the full length L of the body member 2 and provides support to the body member 2. For example, if the body member 2 is made of plastic, the structural support clip 20 can be formed of a harder plastic, metal, metal alloy, aluminum or other suitable material and helps prevent the body member 2 from warping.

Figure 6:
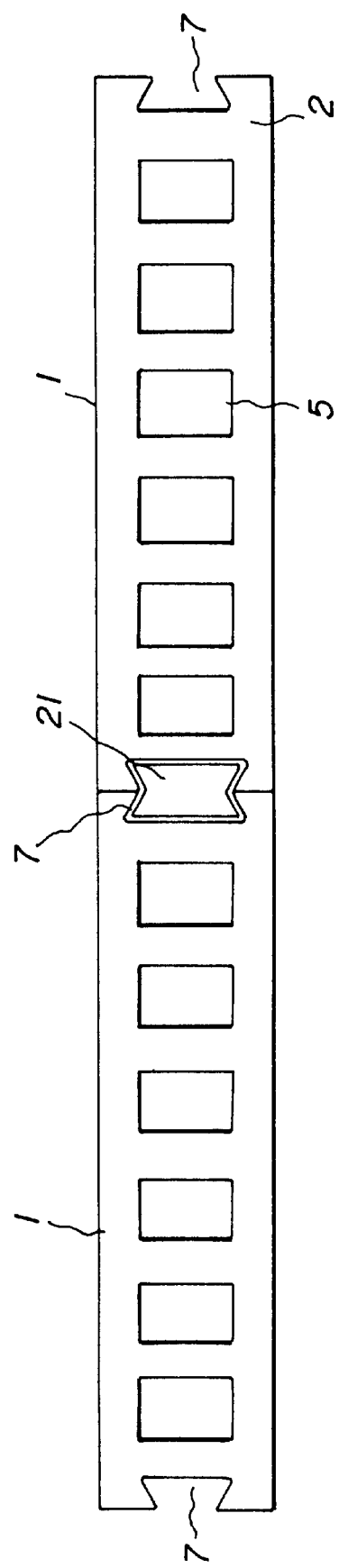
FIG. 6 is a front elevational view of a set of two interconnected frame hanging tools.
Figure 7:
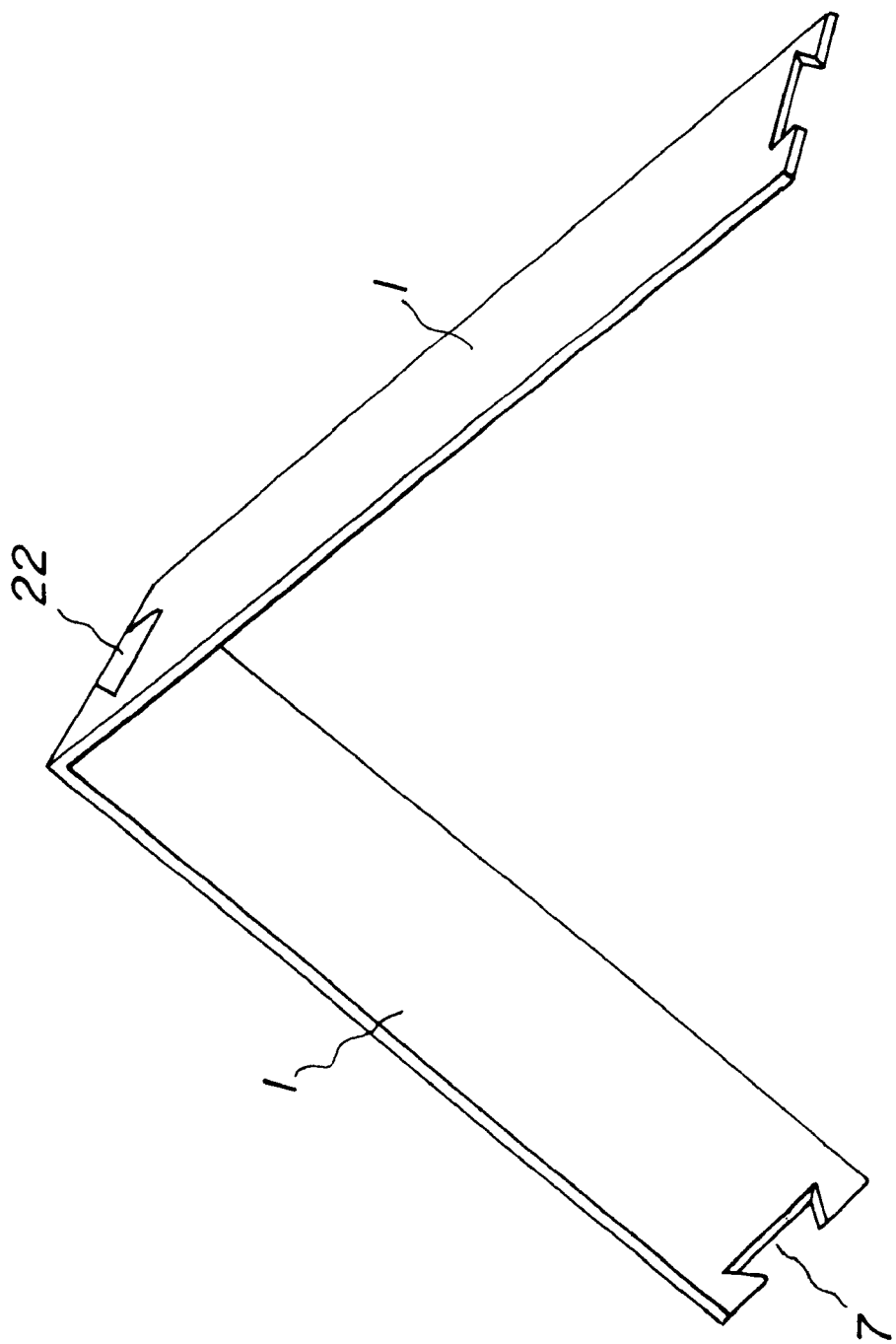
FIG. 7 is a front elevational view of two frame hanging tools connected 90° to each other.

An end connector 21 is also shown in FIG. 5. The end connector 21 is used to connect adjacent frame hanging tools 1 together as shown in FIG. 6. FIG. 7 shows adjacent frame hanging tools 1 connected at right angles to each other with a right angled end connector 22. In this manner, the frame hanging tool 1 can be used for working in corners. It is further noted that the end connectors 21, 22 can be formed to connect adjacent frame hanging tools 1 at any angle (i.e. 0–360°)

Figure 8:
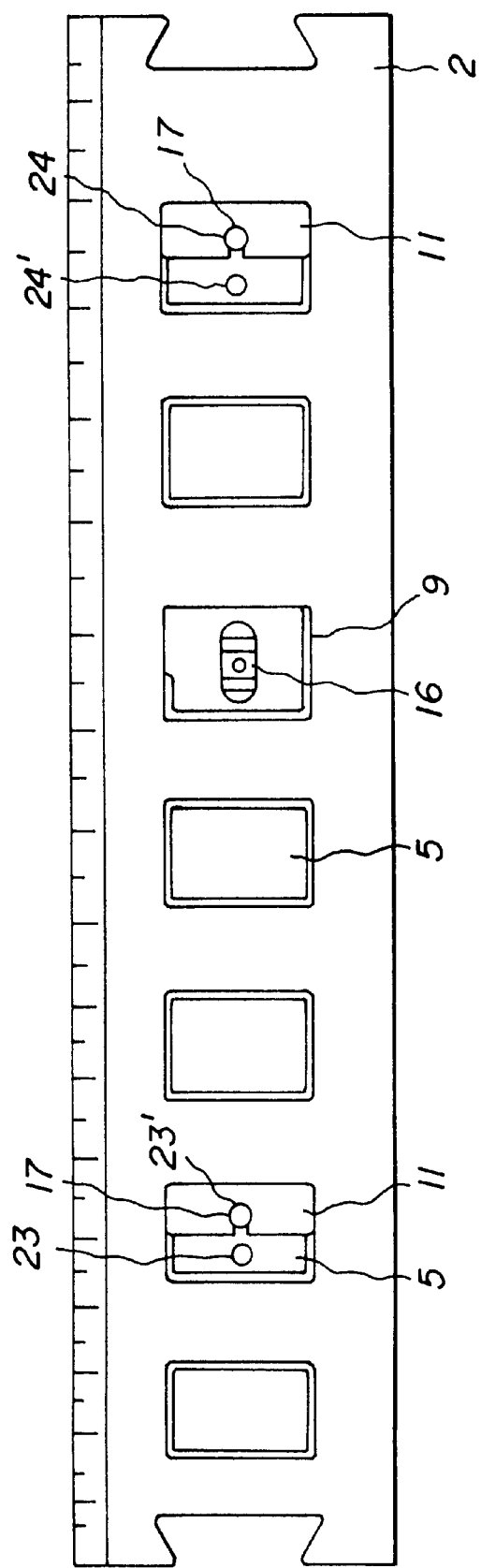
FIG. 8 is a front elevational view of the frame hanging tool used in conjunction with fasteners.

The frame hanging tool 1 is easy to use. First, one determines the type of fastener one is going to use such as a nail. Then one selects appropriate inserts 11 for the type of fastener and places them into appropriate positions in selected openings 5 of the body member 2. In addition, at least one leveling insert 9 should also be placed in the body member 2. Next, a height at which to set the frame is determined. A first nail 23 is secured (nailed) into the structure upon which the frame will rest. Then, one end of the frame hanging tool 1 is set over the first nail 23 (FIG. 8) in the area of the opening 5 not covered by the insert 11. The frame hanging tool 1 is then slide over such that the first nail is now in the position shown by reference number 23' in the opening 17 of the insert 11. A second nail 24 is then slid into the opening 17 of a second insert 11. The frame hanging tool 1 is then pivoted about the first nail 23' until the level insert 9 indicates that the second nail 24 is true (level) with the first nail 23'. At this point the second nail 24 is secured to the structure. The frame hanging tool 1 is them slide such that the first nail is in the position shown by reference numeral 23 and the second nail is in the position shown by reference number 24'. At this point, the frame hanging tool 1 is lifted away from the structure. Of course, many different variations for using the frame hanging tool 1 are possible and this example is only illustrative for understanding the invention.

It is noted that a third, fourth, or fifth . . . fastener can be aligned from the last fastener(s). In addition, it is noted that the frame hanging tool 1 can be placed on a preexisting fastener already set in the wall.

Figure 9:
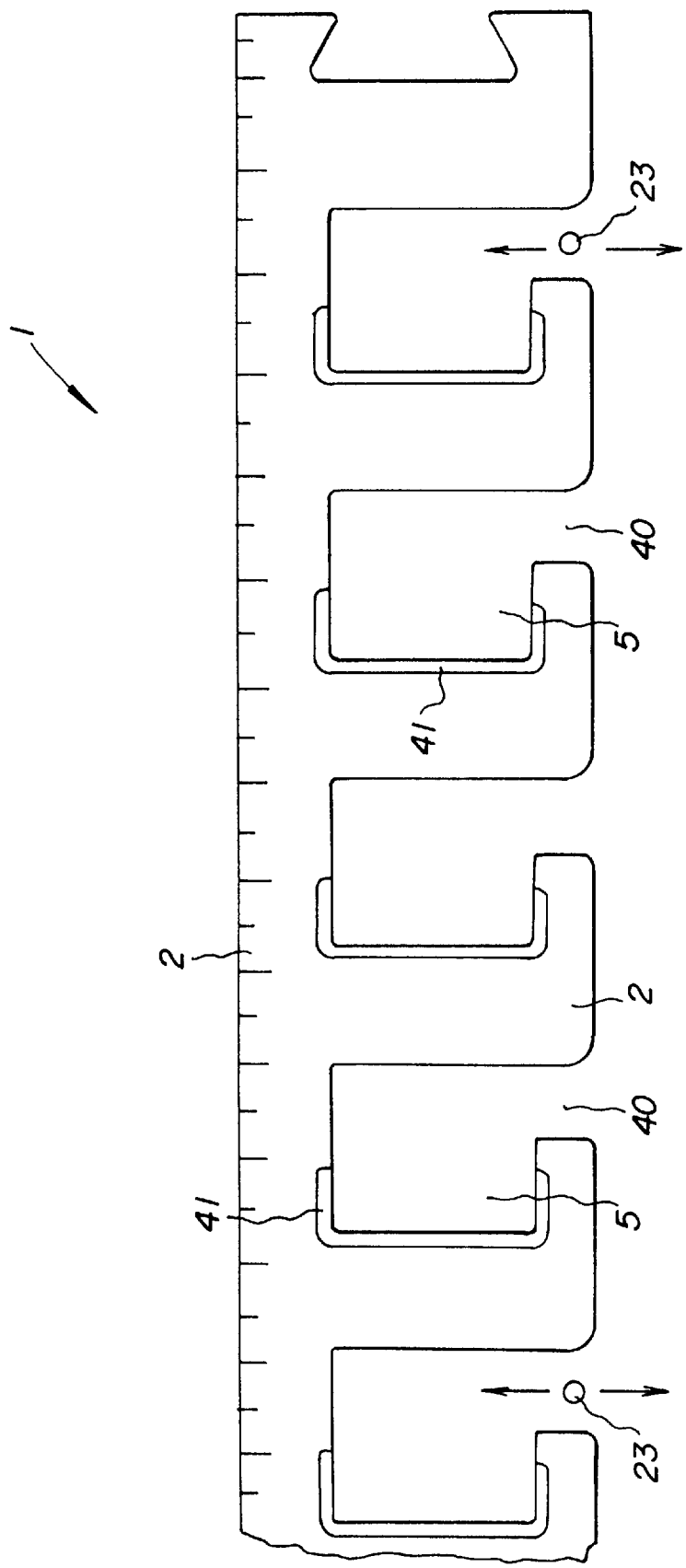
FIG. 9 is an enlarged, fragmentary, front elevational view of the first end portion of a second embodiment of the frame hanging tool.

FIG. 9 shows a second embodiment of the frame hanging tool 1. The second embodiment differs from the first embodiment in that fastener openings 40 are provided in the body member 2. The fastener openings 40 allow the frame hanging tool 1 to be slid over the fasteners 23 fastened to a structure in the vertical direction. In contrast to the recessed borders of FIGS. 1–8, the recessed borders 41 of FIG. 9 only partially surround the openings 5. It is noted that the fastener openings 40 and the recessed borders 41 could be placed on the opposite sides of those shown in FIG. 9.

We claim:

1. A frame hanging tool, comprising:
   an elongated body member having a plurality of openings formed therein; and
   at least one insert inserted in one of said plurality of openings and self securing to said elongated body member, said at least one insert receiving and guiding a fastener to be secured to a structure.

2. The frame hanging tool according to claim 1, wherein said at least one insert is one of a plurality of inserts including a leveling insert having a level for determining whether a plurality of fasteners are aligned level with respect to each other and a fastener guiding insert for receiving and aligning one of the plurality of fasteners.

3. The frame hanging tool according to claim 1, including a ruler disposed on said elongated body member.

4. The frame hanging tool according to claim 1, wherein said elongated body member is formed of a material selected from the group consisting of wood, plastic, metal and composite material.

5. The frame hanging tool according to claim 1, wherein said elongated body member has a length of approximately 12 inches.

6. The frame hanging tool according to claim 1, wherein said elongated body member has a length of approximately 24 inches.

7. The frame hanging tool according to claim 1, wherein said elongated body member has a length of approximately 36 inches.

8. The frame hanging tool according to claim 1, wherein said elongated body member has recessed borders formed therein for self engaging with said at least one insert.

9. The frame hanging tool according to claim 8, wherein said at least one insert has overhanging edges for securing to said recessed borders of said elongated body member.

10. The frame hanging tool according to claim 1, wherein said elongated body member has ends each with an end opening formed therein.

11. The frame hanging tool according to claim 10, including an end connector received in said end opening of each of two adjacent elongated body members for joining said adjacent elongated body members.

12. The frame hanging tool according to claim 1, wherein said at least one insert has a fastener guide path and a semicircular hole formed therein for receiving and guiding the fastener.

13. The frame hanging tool according to claim 1, wherein said at least one insert has a U-shaped fastener opening formed therein for receiving and guiding the fastener.

14. The frame hanging tool according to claim 1, wherein said at least one insert is substantially L-shaped.

15. The frame hanging tool according to claim 1, wherein said at least one insert has a side formed with a step for receiving and guiding the fastener.

16. The frame hanging tool according to claim 1, wherein said elongated body member has a length of approximately 18 inches.

17. A frame hanging tool, comprising:
    an elongated body member having more than two openings adapted to receive an insert; and
    at least one insert adapted to be inserted into each of said openings and self securing to said elongated body member, said at least one insert formed to receive and guide a fastner to be secured to a structure.

18. A frame hanging tool, comprising:
    an elongated body member having substantially square openings adapted to receive an insert; and
    at least one insert adapted to be inserted into each of said openings and self securing to said elongated body member, said at least one insert formed to receive and guide a fastener to be inserted to a structure.

19. A frame hanging tool, comprising:
    an elongated body member having a relatively small vertical span and a relatively large horizontal span, said body member defining openings each symmetrically disposed with respect to said vertical span; and
    at least one insert in one or said plurality of openings and self securing to said elongated body member, said at least one insert formed to receive and guide a fastener to be sercured to a structure.

20. A frame hanging tool, comprising:
    an elongated body member having more than two openings adapted to receive an insert; and
    at least one insert adapted to be inserted into each of said plurality of openings and self securing to said elongated body member, said at least one insert formed to receive and guide a fastner to be secured to a structure with one of a group consisting of a nail, a screw, and a bolt.

21. A frame hanging tool, comprising:
    an elongated body member having openings formed therein; and
    inserts each to be inserted in one of said plurality of openings and self securing to said elongated body member, at least one of said inserts formed to receive and guide a fastner to be secured to a structure, at least another one of said inserts defining a recess and including a removable level removably secured in said recess.

* * * * *